(12) United States Patent
Danish et al.

(10) Patent No.: US 7,885,956 B2
(45) Date of Patent: Feb. 8, 2011

(54) DISPLAY AND SEARCH INTERFACE FOR PRODUCT DATABASE

(75) Inventors: Mohamed Sherif Danish, Cupertino, CA (US); Kris Walter Kimbrough, Sunnyvale, CA (US)

(73) Assignee: Kelora Systems, LLC, Cupertino, CA (US)

( * ) Notice: Subject to any disclaimer, the term of this patent is extended or adjusted under 35 U.S.C. 154(b) by 390 days.

(21) Appl. No.: 12/070,711

(22) Filed: Feb. 19, 2008

(65) Prior Publication Data
US 2009/0043759 A1 Feb. 12, 2009

Related U.S. Application Data

(60) Provisional application No. 60/904,889, filed on Mar. 5, 2007.

(51) Int. Cl.
G06F 7/00 (2006.01)
G06F 17/30 (2006.01)

(52) U.S. Cl. .................. 707/723; 707/736; 707/748; 707/758; 707/770; 707/803; 705/14.14; 705/14.11; 705/14.19; 705/14.35

(58) Field of Classification Search .................. 707/723, 707/736, 748, 758, 769, 770, 805; 705/14, 705/14.1, 14.11, 14.19, 14.35
See application file for complete search history.

(56) References Cited

U.S. PATENT DOCUMENTS

| | | | |
|---|---|---|---|
| 5,715,444 A | 2/1998 | Danish et al. | |
| 5,983,219 A | 11/1999 | Danish et al. | |
| 5,983,220 A | 11/1999 | Schmitt | |
| 6,032,145 A | 2/2000 | Beall et al. | |
| 6,072,490 A * | 6/2000 | Bates et al. | 707/E17.013 |
| 6,169,992 B1 * | 1/2001 | Beall et al. | 707/3 |
| 6,275,821 B1 | 8/2001 | Danish et al. | |
| 6,298,446 B1 | 10/2001 | Schreiber et al. | |
| 6,324,536 B1 | 11/2001 | Rofrano | |

(Continued)

OTHER PUBLICATIONS

IntelliMAX—"Product Family—Advanced Load Management Products" 2005 Fairchild Semoconductor (The Power Franchise) (pp. 1-16).*

(Continued)

Primary Examiner—Jean B. Fleurantin
Assistant Examiner—Anh Ly
(74) Attorney, Agent, or Firm—Donald L. Bartels; Bartels Law Group (57) ABSTRACT

A technique for displaying and searching databases provides a user interface that displays a list of attribute values of a product along with corresponding user interface elements, each containing a set of clickable sub-elements corresponding to subsets of possible attribute values with different ranks. The sub-element whose corresponding rank matches a corresponding rank of the attribute value is displayed as highlighted. Clicking a sub-element constrains a current selected set of products to those whose attribute values have the same rank as the clicked sub-element. On mouse-over of a selected sub-element, pop-up text is displayed containing a set of possible attribute values whose rank corresponds to that of the selected sub-element, and decision support information associated with each of the displayed possible attribute values, e.g., a percentage of users who have selected the attribute value, a percentage of users who have purchased a product with the attribute value, or a price range of product records having the attribute value.

50 Claims, 4 Drawing Sheets

U.S. PATENT DOCUMENTS

| 6,327,588 | B1 | 12/2001 | Danish et al. | |
|---|---|---|---|---|
| 7,117,163 | B1* | 10/2006 | Iyer et al. | 705/10 |
| 2002/0077930 | A1* | 6/2002 | Trubey et al. | 705/26 |
| 2002/0078016 | A1* | 6/2002 | Lium et al. | 707/1 |
| 2002/0152200 | A1* | 10/2002 | Krichilsky et al. | 707/3 |
| 2005/0160004 | A1* | 7/2005 | Moss et al. | 705/14 |
| 2009/0006220 | A1* | 1/2009 | Wight et al. | 705/27 |

OTHER PUBLICATIONS

Arnold A. Kamis and Edward A. Stohr—"Parametric Search engines: What makes them effective when shopping online for differntiated products?"—ScienceDirect, Information & Management 43 Aug. 11, 2006 (pp. 904-918).*

Lewenstein et al.—"Optimization of entanglement witnesses"—Physical Review A, vol. 62, 052310, Oct. 16, 2000 (pp. 1-16).*

Otto et al.—"A Method for Architecting Product Platforms"—Research in Engineering design, Dec. 2000 (pp. 61-72).*

Mostafa El-Khamy and Roberto Garello—"On the weight enumerator and the maximum likelihood performance of linear product codes" arXiv:Cs/0601095v1 [cs.IT], Jan. 23, 2006 (pp. 1-27).*

* cited by examiner

*Fig. 10*

DISPLAY AND SEARCH INTERFACE FOR PRODUCT DATABASE

CROSS-REFERENCE TO RELATED APPLICATIONS

This application claims priority from U.S. Provisional Patent Application 60/904,889 filed Mar. 5, 2007, which is incorporated herein by reference.

FIELD OF THE INVENTION

The present invention relates generally to computer-implemented methods for displaying and searching databases. More specifically, it relates to providing an improved user interface for displaying and searching a database of products.

BACKGROUND OF THE INVENTION

Computer database systems are commonly used to store information about products and provide customers with an interface to view and search for products. Some families of products have a relatively small set of attributes and can be searched with relative ease. For example, hiking boots typically have just a few attributes such as manufacturer, model, and shoe size. Other families of products, however, can have a dozen or more attributes. For example, laptop computers have attributes including manufacturer, model, processor type, processor speed, amount of memory, maximum memory capacity, hard disk storage capacity, screen size, optical disk drive type, WiFi capability, WiFi type, BlueTooth capability, communication ports, retail store, and retail price. Searching and comparing products having so many attributes can be a complicated and confusing task. One technique to facilitate the search for products, called a parametric search, is described in U.S. Pat. No. 5,715,444, which is incorporated herein by reference. According to this technique, a user is presented with a screen containing a collection of groupings representing different attributes or features. Each grouping contains a set of possible alternative attribute values from which the user can select. The user selections are used as criteria in a search query. Results of the query are displayed together with a revised display of groupings representing remaining alternate attribute values which may be selected. Even with this parametric search technique, however, it can still be challenging for customers to search for products having a large number of attributes, especially when the products have various highly technical attributes: For example, a non-technical user may not know the difference between 802.11(n) and 802.11(g) wireless networking standards, or what significance that may have on product value. Consequently, the user may have difficulty deciding which products to search for and ultimately consider for purchase. Due to these and various other remaining difficulties associated with existing search techniques, there is still a need for improved techniques for searching and displaying product information to users.

SUMMARY OF THE INVENTION

According to one aspect, the present invention provides an improved technique for displaying and searching databases. More specifically, it provides an improved user interface for displaying and searching a database of commercial products. A database of product records describing products belonging to a family of products is stored, e.g., at a database server. Each of the product records contains a collection of attribute values specifying distinct product attributes.

A user interface to the database is provided, e.g., sent to a client over a data network by a web server and then executed by the client computer. The user interface includes executable instructions including instructions to display to a user data contained in the database and also accept user input, e.g., search criteria. The user input is then responded to, e.g., by the web server providing search results to the client.

The user interface includes computer executable instructions to display in a single view a list of attribute values of a product record contained in a current selected set of the product records in the database. In some embodiments, multiple lists of attribute values for multiple product records may be displayed in a single view, e.g., in a grid layout. The attribute values for a product represent distinct attributes of the product. An attribute name may be displayed next to an attribute value.

Next to an attribute value a corresponding user interface element is displayed. The user interface element contains a set of clickable sub-elements arranged in a linear sequence, e.g., a linear sequence of graphic icons such as diamonds, stars, or circles. Each clickable sub-element corresponds to a predetermined rank and corresponds to a predetermined sub-set of possible attribute values for the attribute. In some embodiments, multiple user interface elements comprising corresponding sets of clickable sub-elements arranged in linear sequences may be displayed next to multiple corresponding attribute values.

When a sub-element is clicked by a user, a query is generated and submitted, e.g., sent from the client to the server. The query contains search criteria to constrain the current selected set of product records to a subset of the current selected set of product records. Each product record in the subset has an attribute value contained in the set of possible attribute values associated with the clicked sub-element.

The user input is responded to by receiving the submitted query, e.g., at the web server, performing a database search in response to the query, e.g., at the database server, and providing results of the database search for display, e.g., by sending the results from the web server to the client.

Similarly, when an attribute value is clicked by a user, a request is submitted to restrict the currently found set of product records to a subset of product records having the clicked attribute value or having a numeric attribute value within a predetermined deviation from the clicked attribute value. In response, an indication that the attribute value is locked may be displayed next to the attribute value. If a sub-element corresponds to an attribute value selected by the user, an embellishment of the sub-element may be displayed, e.g., a square or circle surrounding the sub-element. In some embodiments, an advertisement dynamically selected based on the clicked sub-element may be displayed.

One of the clickable sub-elements of the user interface element is displayed as highlighted. The highlighted sub-element is the sub-element whose corresponding rank matches a corresponding rank of the attribute value. The predetermined rank of each attribute value and corresponding clickable sub-element is determined by a predefined ranking logic. For some attributes, the predetermined rank of each clickable sub-element corresponds to a range of qualitative attribute values. For other attributes, the predetermined rank of each clickable sub-element corresponds to a range of quantitative attribute values.

On mouse-over of a selected sub-element, a pop-up text element is displayed. The pop-up text element displays: i) a set of possible attribute values having a common rank equal to the predetermined rank of the selected sub-element, and ii) decision support information associated with each of the displayed possible attribute values. The decision support information may include information such as a percentage of users who have selected the attribute value, a percentage of users who have purchased a product with the attribute value, or a price range of product records having the attribute value. In some embodiments, the text element displays a first price range for all products having a particular attribute value and a second price range for a subset of products also constrained by selections of other attribute values.

If none of the current found set of product records has an attribute value within the set of attribute values corresponding to a sub-element, then the sub-element is displayed in modified form, e.g., with low contrast or "grayed out." Upon mouse-over of such an unavailable sub-element, a warning message may be displayed, e.g., indicating that, if the sub-element is clicked, then at least one pre-selected attribute value will be dropped in order to find a product record with an attribute value within a set of attribute values corresponding to the unavailable sub-element.

In some embodiments, an increase/decrease indicator, e.g., an up arrow or down arrow, may be displayed next to an attribute value. The indicator compares the rank of the attribute value with a rank of a corresponding attribute value of a previously displayed product record, i.e., indicating how the attribute value changed relative to the previous product.

In some embodiment, an upgrade element may be displayed next to an attribute value. If the upgrade element is clicked by a user, a query to find a set of product records having an upgraded attribute value is submitted. Similarly, a downgrade element may be displayed next to the attribute value. If the downgrade element is clicked by a user, a query to find a set of product records having a downgraded attribute value is submitted.

DETAILED DESCRIPTION

Figure 1:
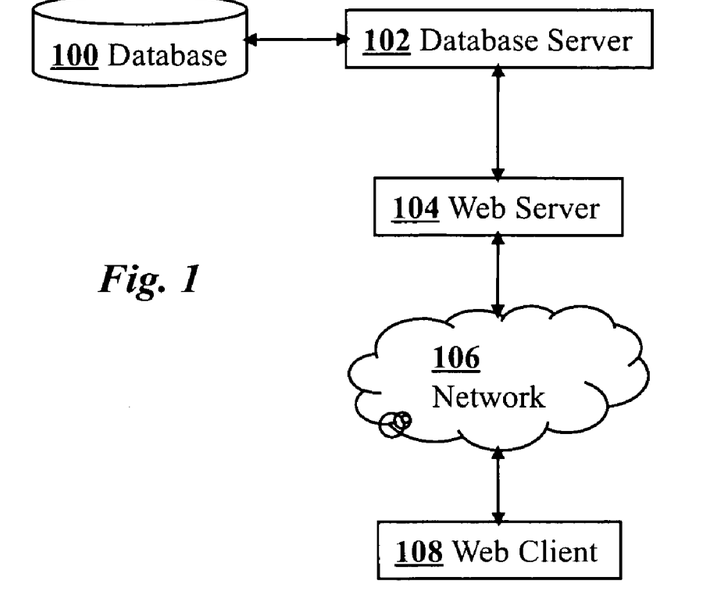
FIG. 1 is a schematic illustration of a system implementing an embodiment of the present invention.
Figure 2:
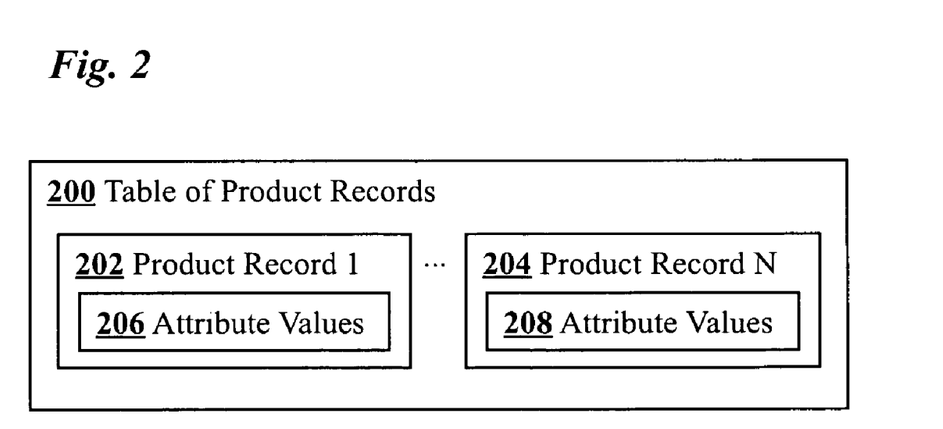
FIG. 2 is a schematic diagram illustrating a table of product records according to an embodiment of the present invention.

FIG. 1 illustrates a system implementing an embodiment of the present invention. The system includes a database server 102 that accesses a stored database 100 of product records describing products belonging to a family of products. A shown in FIG. 2, a table of product records 200 contains a collection of N product records, such as first product record 202 and last product record 204. Each of the product records contains a collection of attribute values specifying distinct product attributes. For example, record 202 contains attribute values 206 and record 204 contains attribute values 208.

Returning to FIG. 1, the database server 102 communicates with a web server 104. Although the database server 102 and web server 104 are described here as distinct, they may also be implemented as a single device. Web server 104 communicates via network 106 with web client 108. Although the system is described here as a web client-server model, in other embodiments the a database client-server model or other suitable models may be used.

Figure 3:
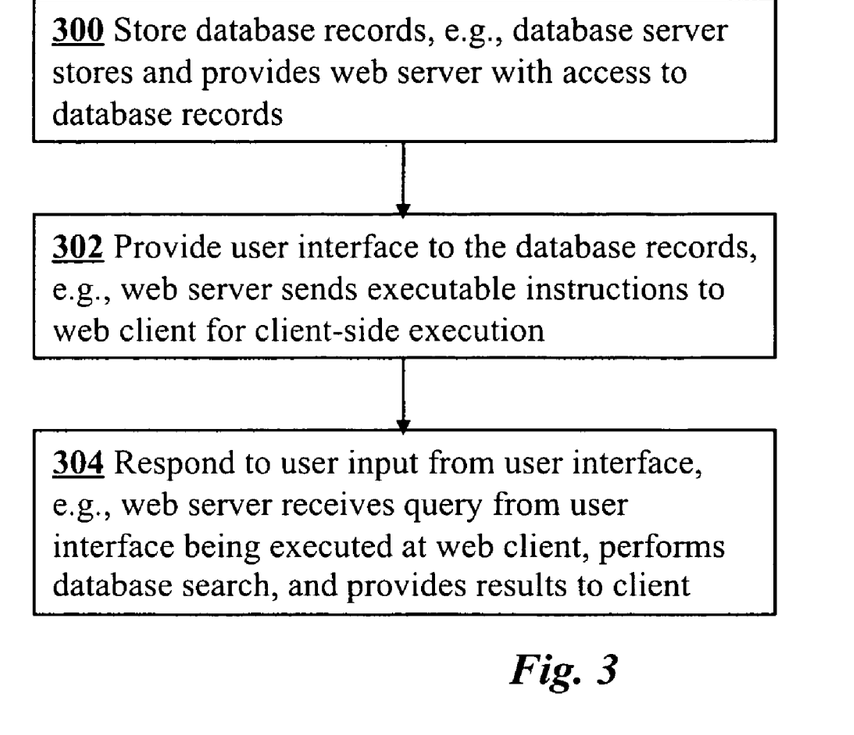
FIG. 3 is a flow chart that outlines steps performed in a preferred embodiment of the invention.

FIG. 3 is a flow chart that outlines steps performed in a preferred embodiment of the invention. In step 300, the database server stores the product records and provides the web server with access to them. In step 302 the web server provides a user interface to the database by sending executable instructions to a web client over a data network for client-side execution. Included in the executable instructions are instructions to display data contained in the database to a user of the web client and also instructions to accept input from the user of the web client. In step 304 the server responds to the user input submitted from the web client to the web server by providing search results to the client.

Figure 4:
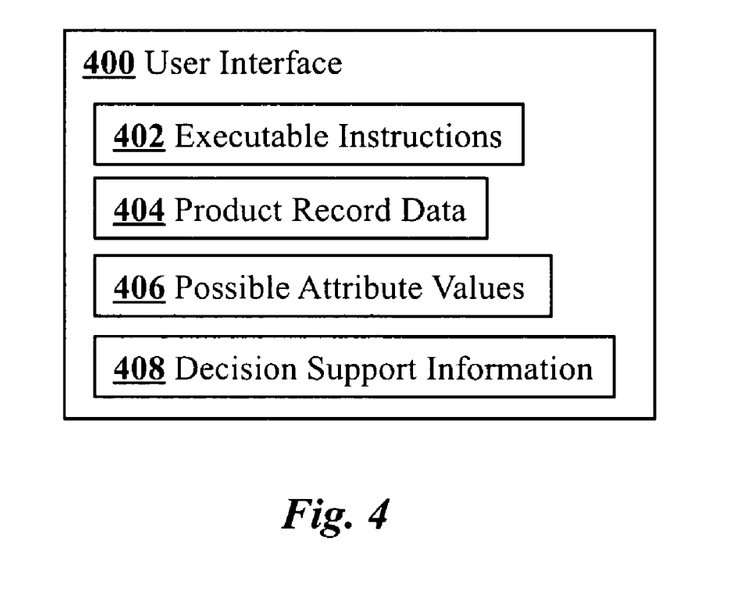
FIG. 4 is a schematic diagram illustrating user interface data provided by a server to a client according to an embodiment of the invention.

FIG. 4 is a schematic diagram illustrating the contents of a user interface 400 according to an embodiment of the invention. The user interface is a data file or collection of files that includes executable instructions 402 intended to be executed by a client computer. For example, the user interface may be an HTML file containing JavaScript. The user interface may also include other types of data such as product record data 404, possible attribute values 406, and decision support information 408, as will be described in more detail below.

Figure 5:
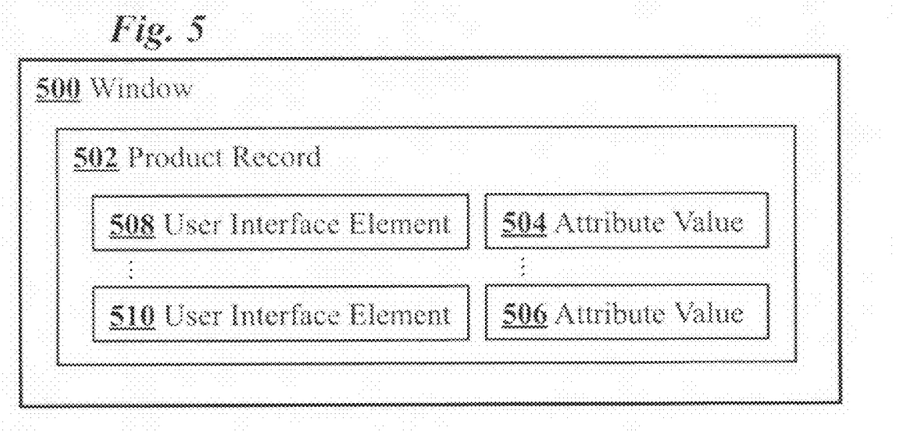
FIG. 5 is a schematic illustration of a browser window displayed on a client-side computer screen according to an embodiment of the invention.

FIG. 5 is a schematic representation of a browser window 500 displayed on a client-side computer screen. The user interface includes computer executable instructions to display information from a product record 502 in a window 500. The product record 502 is one record in a current selected set of the product records of the database. At the beginning of a client search session, for example, the current selected set may include all product records in the database. As the search session progresses, the current selected set may be narrowed. In some embodiments, information from multiple product records may be displayed simultaneously in the single window 500, allowing them to be compared.

The product record information for record 502 includes a list of attribute values 504 through 506 which represent distinct attributes of the product. Also displayed is a list of user interface elements 508 through 510 corresponding to the attribute values 504 through 506, respectively. In embodiments where information from multiple product records is displayed simultaneously in window 500, multiple lists of attribute values and multiple lists of corresponding user interface elements are displayed in a single view. For example, in a grid layout the attribute value lists may be displayed as distinct columns with each row representing a distinct attribute.

Figure 6:
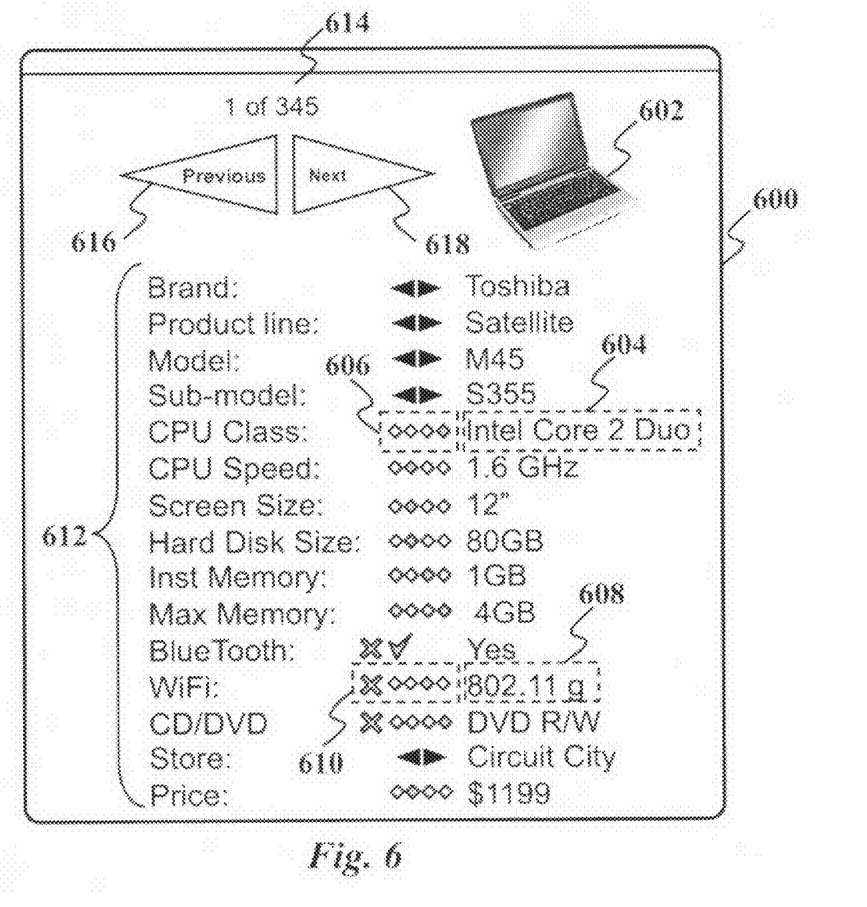
FIG. 6 is illustrates a rendered user interface window containing information from a product record, according to an embodiment of the invention.

By way of example, FIG. 6 is an illustration of a user interface window 600 containing information from a product record associated with a laptop computer. A product image 602 is shown above a column of attribute values, which includes attribute values 604 and 608. Displayed adjacent to the attribute value column is a column of corresponding user interface elements, which includes elements 606 and 610. Also displayed is a corresponding attribute name column 612 containing a names for each of the distinct attributes of the product. Also displayed is an indication of the number of records in the current found set 614. Buttons 616 and 618 allow the user to change the displayed product record in the current found set to a previous or next product record, respectively.

The user interface element corresponding to an attribute value contains a set of clickable sub-elements arranged in a linear sequence, e.g., a linear sequence of graphic icons such as diamonds, stars, or circles. For example, element 606 corresponding to attribute value 604 contains a sequence of four clickable diamonds. Similarly, element 610 corresponding to attribute value 608 contains a sequence of four clickable diamonds as well as an "X" icon. These clickable sub-elements provide the user with intuitive information that facilitates searching, as will now be described in more detail.

Figure 7:
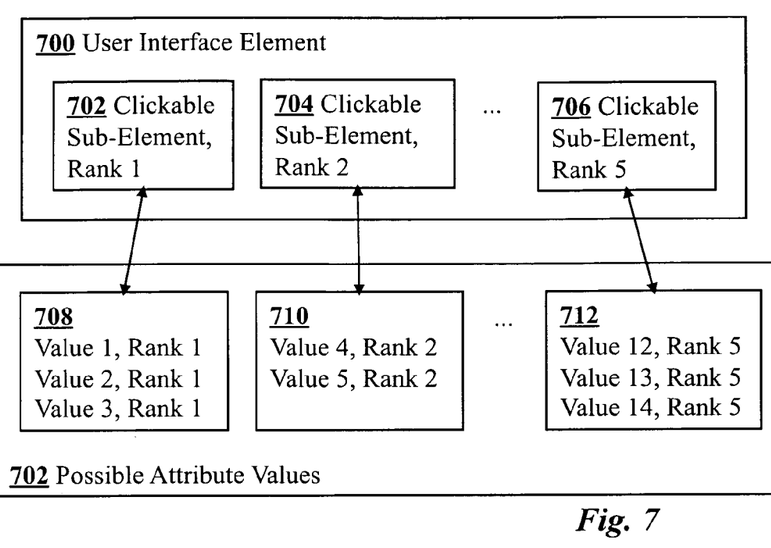
FIG. 7 is a schematic diagram showing correspondences between user interface sub-elements and subsets of attribute values, according to an embodiment of the invention.

As shown schematically in FIG. 7, a user interface element 700 for a given attribute value has associated with it a corresponding set of possible attribute values 702. The displayed attribute value corresponding to the user interface element 700 is one of these possible attribute values 702. The clickable sub-elements 702, 704, 706 correspond, respectively, to predetermined ranges 708, 710, 712 of the possible attribute values 702. A range of possible attribute values may be represented by a discrete set of possible attribute values. A range of quantitative attribute values may alternatively be represented by a specification of a lower limit value and upper limit value. Examples of qualitative attributes include processor type, WiFi networking protocol, and manufacturer. Examples of quantitative attributes include memory capacity, disk capacity, and processor speed.

Each of the sub-elements 702, 704, 706 has a unique predetermined rank, and each of the ranges 708, 710, 712 contains the subset of the possible attribute values whose rank matches the rank of its corresponding sub-element. For example, clickable sub-element 702 has predetermined rank 1 and corresponds to subset 708 containing possible attribute values with rank 1. The predetermined rank associated with a range of possible attribute values and corresponding clickable sub-element is determined by a predefined ranking logic. Ranking logic, for example, can be based on size, e.g., hard disk capacity of a laptop computer, where larger capacity corresponds to higher rank. It can also be based on quality, e.g., in diamonds, a whiter color corresponds to a higher rank than a yellowish color. Ranking logic could also determine a rank from a combination of features, e.g., in diamonds, a rank can be calculated from a weighted combination of cut, carat, color, and clarity. Also, ranking can be based on the price of the attribute value, e.g., a cashmere sweater is higher in price and rank than a similar sweater in polyester.

Figure 8:
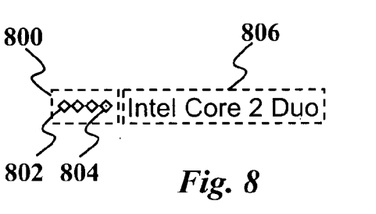
FIG. 8 shows in detail a rendered attribute value and its corresponding user interface element containing four sub-elements corresponding to different ranks, according to an embodiment of the invention.

FIG. 8 shows in detail an attribute value 806 and its corresponding user interface element 800 containing four sub-elements, including leftmost sub-element 802 having rank 1 and rightmost sub-element 804 having rank 4. Displayed attribute value 806 is among the set of possible attribute values. In this example, attribute value 806 has rank 4 and therefore corresponds to the range of possible attribute values associated with rightmost sub-element 804. Consequently, sub-element 804 is displayed as highlighted. More generally, the highlighted sub-element is that sub-element whose rank matches the rank of the displayed attribute value. Because higher ranks are assigned to attributes considered to indicate higher value, the display of the highlighted sub-element provides the user with an intuitive indication of the value of the displayed attribute. In this example, because rightmost sub-element 804 is highlighted, the user easily sees that displayed attribute 806 is among those attribute values having the highest rank and value, thereby providing valuable assistance to the user in understanding the significance of the displayed attribute value, especially if the attribute is highly technical in nature.

Figure 9A:
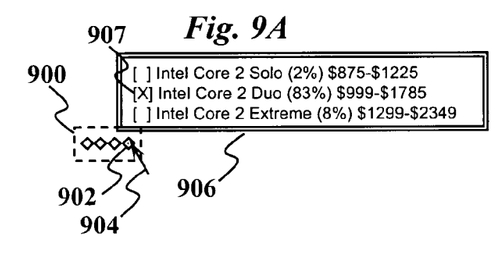
FIGS. 9A and 9B illustrate pop-up text elements displayed on mouse-over of two different user interface sub-elements, according to an embodiment of the invention.
Figure 9B:
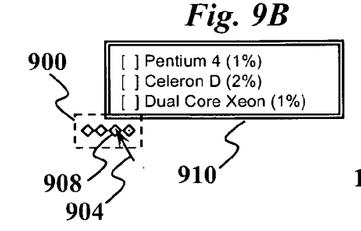

In some embodiments, on mouse-over of a selected sub-element, a pop-up text element is displayed, as illustrated in FIGS. 9A and 9B. If mouse pointer 904 is positioned by a user in the proximity of sub-element 902 of user interface element 900, then pop-up text element 906 is displayed, as shown in FIG. 9A. The pop-up text element 906 displays a range of possible attribute values having a common rank equal to the predetermined rank of the selected sub-element 902. In this example, three possible attribute values are displayed, namely, three processor types having rank 4 (because sub-element 902 has rank 4). Next to each of the attribute values in the pop-up text element 906 is displayed an associated check-box, e.g., check-box 907, indicating which attribute value is currently selected, allowing the user to select or de-select a specific attribute value by clicking its associated check-box.

The pop-up text 906 also displays decision support information associated with each of the displayed possible attribute values. In this example, the decision support information includes, for each of the possible attribute values, a percentage of users who have selected that attribute value and a price range of product records having that attribute value. Through the display of this pop-up text, the user is provided with helpful information about the various alternate attribute values of a given a rank. If mouse pointer 904 is positioned in the proximity of sub-element 908, as shown in FIG. 9B, then pop-up text element 910 is displayed. Text element 910 displays a range of possible attribute values having a common rank equal to the predetermined rank of the selected sub-element 908. In this example, three possible attribute values are displayed, namely, three processor types having rank 3 (because sub-element 908 has rank 3). The user is thereby provided with details of the possible attribute values associated with rank 3 and related decision support information.

In other embodiments, the decision support information for an attribute value may include, instead or in addition to the percentage of users who selected the attribute, a percentage of users who have purchased a product with that attribute value, and/or a price range of product records having that attribute value. In some embodiments, the text element displays a price range for all products having a particular attribute value, and also displays a price range for a subset of products also constrained by current selections of other attribute values.

An important feature of the sub-elements is that they are clickable. When a sub-element is clicked by a user, a query is generated and submitted to the server. The query contains search criteria to constrain the current selected set of product records to a subset of the current selected set of product records. Each product record in the subset has an attribute value contained in the set of possible attribute values associated with the clicked sub-element. For example, if the user clicks sub-element 902 of FIG. 9A, then a query is generated and submitted to the server. The query includes information identifying the attribute associated with the sub-element (i.e., "Processor Type" in this example) and the rank associated with the sub-element (i.e., "4" in this example). At the web server, the user query is received and a database search is performed in response to the query using the database server. Results of the database search are provided for display by sending the results from the web server to the client. In this example, the database search would constrain the currently found set of records to records whose "Processor Type" attribute has rank 4, i.e., has one of the three attribute values shown in the pop-up text box 906.

In some embodiments, the displayed attribute value is itself also clickable. For example, attribute value 806 in FIG. 8 may be clickable. When an attribute value is clicked by a user, a search query is submitted to restrict the currently found set of product records to a subset of product records having that attribute value. This search query constrains the found set of records to a smaller set than clicking sub-element 804. In some embodiments, the search query or search operation is relaxed so that the resulting records need not have attribute values exactly matching the clicked attribute value. For example, the resulting records may have a numeric attribute value within a predetermined deviation from the clicked attribute value.

Figure 10:
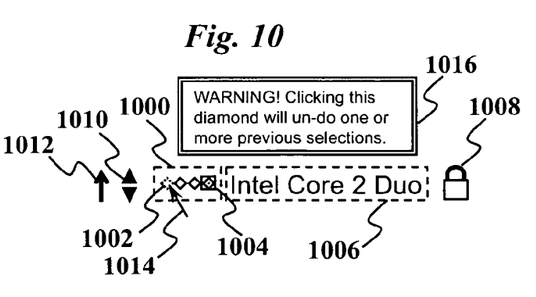
FIG. 10 illustrates various additional features and user interface elements which may be displayed and associated with a displayed attribute value and its associated user interface sub-elements, according to an embodiment of the invention.

In response to the clicking of a specific attribute value, an updated display may include an indication that the attribute value is locked, as shown in FIG. 10. This indication, such as a "lock" icon 1008 may be displayed next to the attribute value 1006.

If a sub-element corresponds to (i.e., has the same rank as) an attribute value that has been selected by the user, an embellishment of the sub-element may be displayed. For example, if attribute value 1006 is clicked, then sub-element 1004 of user interface element 1000 is embellished by displaying it with a square around it. Sub-element 1004 is embellished because it has the same rank as the selected attribute value 1006.

In some embodiments, an upgrade/downgrade element 1010 may be displayed next to an attribute value 1006 or user interface element 1000. If the upgrade element is clicked by a user, a query is submitted to find a set of product records having an upgraded attribute value. In the present description an "upgraded" attribute value is a next-highest attribute value in the set of possible attribute values for the attribute, where the possible attribute values are ordered by increasing value. An upgraded attribute value does not necessarily have a higher rank because the upgrade may be to a next highest attribute value within a range of attribute values having the same rank. Similarly, a "downgraded" attribute value is the next-lowest attribute value according to the same ordering. If the downgrade element is clicked by a user, a query to find a set of product records having a downgraded attribute value is submitted.

As mentioned earlier in relation to FIG. 6, the display may include buttons 616 and 618 that select a previous or next record to display from the currently found set of records. When the displayed product record changes, several of the displayed attribute values will likely change as well due to differences in the products. To assist users in recognizing how attribute values have changed, an increase/decrease indicator may be displayed next to an attribute value. The indicator compares the rank of the currently displayed attribute value with a rank of a corresponding attribute value of a previously displayed product record, i.e., indicating how the attribute value changed relative to the previous product. The indicator may be, for example, an up arrow icon or down arrow icon. As an illustration, FIG. 10 shows an indicator 1012 represented by an up arrow, indicating that the attribute value 1006 has a rank higher than the corresponding attribute value of a previously displayed product record, i.e., it has a higher ranked processor type.

When a search is performed and the current found set of product records is constrained, it is possible that some attribute values are no longer available in any of the records of the found set. For example, if a search is performed constraining processor speed attribute to the value of 2.2 GHz, it is possible that none of the lowest ranked processor types are included in the found set of product records. In this situation, it is valuable to provide an indication to the user of the unavailability of these attribute values. Thus, in some embodiments, if none of the current found set of product records has an attribute value within the set of attribute values corresponding to a sub-element, then the sub-element is displayed in modified form, e.g., with low contrast or "grayed out." For example, sub-element 1002 corresponding to rank 1 processor types is displayed in lower contrast than the other sub-elements in user interface element 1000.

If the user mouses-over of such an unavailable sub-element 1002, some embodiments may display a pop-up warning message indicating that, if that sub-element 1002 is clicked, then at least one previously-selected attribute value will be dropped in order to find a product record with an attribute value within a set of attribute values corresponding to the unavailable sub-element. For example, if sub-element 1002 is moused-over, as is shown with arrow 1014, then the user will be warned in pop-up text element 1016 that (because no currently found records have that attribute value) one or more previous search query constraints must be relaxed in order to provide a search result that is not null. If the user proceeds by clicking sub-element 1002, then one or more previous attribute value selections will be removed or relaxed. One option is to drop the previously selected attribute value(s) in the reverse order of their selection. Another option is to display a list of the previously selected options and allow the user to determine the order in which they should be dropped.

In some embodiments, after a user has selected/clicked on a particular attribute value or sub-element, an advertisement dynamically selected based on the clicked sub-element or attribute value may be displayed in the window. As an example, if the user clicks on the Bluetooth option, a search can be performed that identifies an advertisement for Bluetooth wireless headphones, and then the advertisement may be displayed. Another example is if the user clicks on a particular laptop brand, a retailer advertisement can appear showing a special rebate on all laptops of this brand.

The invention claimed is:

1. A computer-implemented method comprising:
    a) storing a database of product records describing products belonging to a family of products; wherein each of the product records contains a collection of attribute values specifying distinct attributes of a product in the family of products;
    b) providing a user interface to the database for displaying to a user data contained in the database and accepting user input; and
    c) responding to the user input; wherein the user interface comprises computer executable instructions for:
        displaying in a single view a list of attribute values of a product record in the database, wherein the list of attribute values corresponds to a list of distinct attributes of a current product record contained in a current selected set of the product records;

displaying next to an attribute value in the list of attribute values a corresponding user interface element comprising a set of clickable sub-elements arranged in a linear sequence, wherein each clickable sub-element of the clickable sub-elements corresponds to a predetermined rank and corresponds to a predetermined subset of possible attribute values for an attribute;

displaying as highlighted a single highlighted clickable sub-element of the clickable sub-elements of the user interface element, wherein the highlighted clickable sub-element has a predetermined rank matching a corresponding rank of the attribute value;

displaying, on mouse-over of a selected sub-element of the clickable sub-elements, a pop-up text element; wherein the pop-up text element displays: i) a set of possible attribute values having a common rank, wherein the common rank matches the predetermined rank of the selected sub-element and ii) decision support information associated with each attribute value in the set of possible attribute values displayed in the pop-up text element; wherein the decision support information includes information chosen from the group consisting of a price range of product records having the attribute value, a percentage of users who have selected the attribute value, and a percentage of users who have purchased a product with the attribute value; and submitting, when a sub-element is clicked by a user, a query constraining the current selected set of the product records to a subset of the current selected set of product records, wherein each product record in the subset has an attribute value within the set of possible attribute values associated with the clicked sub-element;

wherein responding to the user input comprises receiving the submitted query, performing a database search in response to the query, and providing results of the database search for display.

2. The method of claim 1 wherein the storing is performed at a database server computer, wherein the providing and responding is performed by a web server computer not necessarily distinct from the database server computer, and wherein the user interface provided by the web server computer is implemented by a client computer communicating with the server computer over a data network.

3. The method of claim 1 wherein the user interface further comprises computer executable instructions for displaying next to multiple attribute values in the list of attribute values multiple corresponding user interface elements comprising corresponding sets of clickable sub-elements arranged in linear sequences.

4. The method of claim 1 wherein the text element displays a first price range for all products having a particular attribute value and a second price range for a subset of products also constrained by selections of other attribute values.

5. The method of claim 1 wherein the predetermined rank of each clickable sub-element is determined by a predefined ranking logic.

6. The method of claim 1 wherein the predetermined rank of each clickable sub-element corresponds to a range of qualitative attribute values.

7. The method of claim 1 wherein the predetermined rank of each clickable sub-element corresponds to a range of quantitative attribute values.

8. The method of claim 1 wherein the user interface further comprises computer executable instructions for: displaying an unavailable clickable sub-element of the user interface element in modified form if none of a current found set of product records has an attribute value within the set of attribute values corresponding to the sub-element.

9. The method of claim 8 wherein the unavailable clickable sub-element is displayed with low contrast.

10. The method of claim 1 wherein the user interface further comprises computer executable instructions for: displaying a warning message on mouse-over of an unavailable sub-element.

11. The method of claim 10 wherein the warning message indicates that at least one pre-selected attribute value will be dropped in order to find a product record with an attribute value within a set of attribute values corresponding to the unavailable sub-element.

12. The method of claim 1 wherein each sub-element is displayed using a graphic icon selected from the group consisting of diamonds, stars, and circles.

13. The method of claim 1 wherein the user interface further comprises computer executable instructions for: displaying in a grid layout attribute values for multiple product records.

14. The method of claim 1 wherein the user interface further comprises computer executable instructions for: displaying an attribute name next to the attribute value.

15. The method of claim 1 wherein the user interface further comprises computer executable instructions for: submitting, if a user clicks on the attribute value, a request to restrict a currently found set of product records to a subset of product records.

16. The method of claim 15 wherein the subset of product records is constrained to products records having the clicked attribute value.

17. The method of claim 1 wherein the subset of product records is constrained to product records each having a numeric attribute value within a predetermined deviation from the clicked attribute value.

18. The method of claim 1 further comprising displaying next to the attribute value an indication that the attribute value is locked.

19. The method of claim 1 wherein the user interface further comprises computer executable instructions for: displaying an embellishment of a sub-element if the sub-element corresponds to an attribute value selected by the user.

20. The method of claim 19 wherein the embellishment of the sub-element is a surrounding square.

21. The method of claim 1 wherein the user interface further comprises computer executable instructions for: displaying an advertisement dynamically selected based on a clicked sub-element.

22. The method of claim 1 wherein the user interface further comprises computer executable instructions for: displaying next to the attribute value an increase/decrease indicator comparing the rank of the attribute value with a rank of a corresponding attribute value of a previously displayed product record.

23. The method of claim 1 wherein the user interface further comprises computer executable instructions for: displaying an upgrade element next to an attribute value; and submitting, if the upgrade element is clicked by a user, a query to find a set of product records having an upgraded attribute value.

24. The method of claim 1 wherein the user interface further comprises computer executable instructions for: displaying a downgrade element next to an attribute value; and submitting, if the downgrade element is clicked by a user, a query to find a set of product records having a downgraded attribute value.

25. A computer-implemented method comprising:
a) storing a database of product records describing products belonging to a family of products; wherein each of the product records contains a collection of attribute values specifying distinct attributes of a product in the family of products;
b) providing a user interface to the database for enabling the display on a user's computer of data contained in the database and for accepting user input; and
c) responding to the user input;
wherein the user interface comprises computer executable instructions for:
  enabling the user's computer to display in a single view a list of attribute values of a product record in the database, wherein the list of attribute values corresponds to a list of distinct attributes of a product record contained in a selected set of the product records;
  enabling the user's computer to display next to an attribute value in the list of attribute values a corresponding user interface element comprising a set of clickable sub-elements, wherein each clickable sub-element corresponds to a predetermined rank and corresponds to a predetermined subset of possible attribute values for an attribute;
  enabling the user's computer to display as highlighted a single highlighted clickable sub-element of the clickable sub-elements of the user interface element, wherein the highlighted clickable sub-element has a predetermined rank matching a corresponding rank of the displayed attribute value; and
  enabling, when a sub-element is clicked by a user, a query to be generated by the user's computer to be submitted to the user interface, wherein the query contains search criteria to constrain the selected set of product records to a subset of the selected set of product records, wherein each product record in the subset has an attribute value within the set of possible attribute values associated with the clicked sub-element; and
wherein responding to the user input comprises receiving the submitted query, performing a database search in response to the query, and providing results of the database search in the form of executable instructions for enabling the user's computer to display the results.

26. The method of claim 25 wherein providing a user interface to the database for enabling the display by a user of data contained in the database comprises sending the executable instructions to the user's computer.

27. The method of claim 25 further comprising displaying, on mouse-over of a selected sub-element of the clickable sub-elements, a pop-up text element; wherein the pop-up text element displays: i) a set of possible attribute values having a common rank, wherein the common rank matches the predetermined rank of the selected sub-element and ii) decision support information associated with each attribute value in the set of possible attribute values displayed in the pop-up text element; wherein the decision support information includes information chosen from the group consisting of a price range of product records having the attribute value, a percentage of users who have selected the attribute value, and a percentage of users who have purchased a product with the attribute value.

28. The method of claim 25 wherein the storing is performed at a database server computer, wherein the providing and responding is performed by a web server computer not necessarily distinct from the database server computer, and wherein the user interface provided by the web server computer is implemented by a client computer communicating with the server computer over a data network.

29. The method of claim 25 wherein the user interface further comprises computer executable instructions for displaying next to multiple attribute values in the list of attribute values multiple corresponding user interface elements comprising corresponding sets of clickable sub-elements arranged in linear sequences.

30. The method of claim 27 wherein the text element displays a first price range for all products having a particular attribute value and a second price range for a subset of products also constrained by selections of other attribute values.

31. The method of claim 25 wherein the predetermined rank of each clickable sub-element is determined by a pre-defined ranking logic.

32. The method of claim 25 wherein the predetermined rank of each clickable sub-element corresponds to a range of qualitative attribute values.

33. The method of claim 25 wherein the predetermined rank of each clickable sub-element corresponds to a range of quantitative attribute values.

34. The method of claim 25 wherein the user interface further comprises computer executable instructions for: displaying an unavailable clickable sub-element of the user interface element in modified form if none of a current found set of product records has an attribute value within the set of attribute values corresponding to the sub-element.

35. The method of claim 34 wherein the unavailable clickable sub-element is displayed with low contrast.

36. The method of claim 25 wherein the user interface further comprises computer executable instructions for: displaying a warning message on mouse-over of an unavailable sub-element.

37. The method of claim 36 wherein the warning message indicates that at least one pre-selected attribute value will be dropped in order to find a product record with an attribute value within a set of attribute values corresponding to the unavailable sub-element.

38. The method of claim 25 wherein each sub-element is displayed using a graphic icon selected from the group consisting of diamonds, stars, and circles.

39. The method of claim 25 wherein the user interface further comprises computer executable instructions for: displaying in a grid layout attribute values for multiple product records.

40. The method of claim 25 wherein the user interface further comprises computer executable instructions for: displaying an attribute name next to the attribute value.

41. The method of claim 25 wherein the user interface further comprises computer executable instructions for: submitting, if a user clicks on the attribute value, a request to restrict a currently found set of product records to a subset of product records.

42. The method of claim 41 wherein the subset of product records is constrained to products records having the clicked attribute value.

43. The method of claim 25 wherein the subset of product records is constrained to product records each having a numeric attribute value within a predetermined deviation from the clicked attribute value.

44. The method of claim 25 further comprising displaying next to the attribute value an indication that the attribute value is locked.

45. The method of claim 25 wherein the user interface further comprises computer executable instructions for: displaying an embellishment of a sub-element if the sub-element corresponds to an attribute value selected by the user.

46. The method of claim 45 wherein the embellishment of the sub-element is a surrounding square.

47. The method of claim 25 wherein the user interface further comprises computer executable instructions for: displaying an advertisement dynamically selected based on a clicked sub-element.

48. The method of claim 25 wherein the user interface further comprises computer executable instructions for: displaying next to the attribute value an increase/decrease indicator comparing the rank of the attribute value with a rank of a corresponding attribute value of a previously displayed product record.

49. The method of claim 25 wherein the user interface further comprises computer executable instructions for: displaying an upgrade element next to an attribute value; and submitting, if the upgrade element is clicked by a user, a query to find a set of product records having an upgraded attribute value.

50. The method of claim 25 wherein the user interface further comprises computer executable instructions for: displaying a downgrade element next to an attribute value; and submitting, if the downgrade element is clicked by a user, a query to find a set of product records having a downgraded attribute value.

* * * * *